US012159620B2

(12) United States Patent
Zhang et al.

(10) Patent No.: US 12,159,620 B2
(45) Date of Patent: Dec. 3, 2024

(54) TEXT TO SPEECH SYNTHESIS WITHOUT USING PARALLEL TEXT-AUDIO DATA

(71) Applicant: Tencent America LLC, Palo Alto, CA (US)

(72) Inventors: Chunlei Zhang, Bellevue, WA (US); Jiachen Lian, Palo Alto, CA (US); Dong Yu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 183 days.

(21) Appl. No.: 17/953,851

(22) Filed: Sep. 27, 2022

(65) Prior Publication Data

US 2024/0119922 A1 Apr. 11, 2024

(51) Int. Cl.

*G10L 13/10* (2013.01)
*G10L 13/00* (2006.01)
*G10L 13/047* (2013.01)
*G10L 13/06* (2013.01)
*G10L 15/14* (2006.01)

(52) U.S. Cl.

CPC ............ *G10L 13/10* (2013.01); *G10L 13/047* (2013.01); *G10L 13/06* (2013.01); *G10L 2013/105* (2013.01)

(58) Field of Classification Search

None

See application file for complete search history.

(56) References Cited

U.S. PATENT DOCUMENTS

| | | | | |
|---|---|---|---|---|
| 9,292,489 | B1 * | 3/2016 | Sak | G10L 15/26 |
| 2009/0248395 | A1 * | 10/2009 | Alewine | G10L 13/08 704/7 |
| 2016/0093304 | A1 | 3/2016 | Kim et al. | |
| 2018/0336197 | A1 | 11/2018 | Skilling et al. | |
| 2020/0302564 | A1 * | 9/2020 | Varga | G06F 16/24578 |
| 2020/0342849 | A1 * | 10/2020 | Yu | G10L 13/02 |
| 2020/0357381 | A1 * | 11/2020 | Tamura | G10L 13/0335 |
| 2021/0049999 | A1 | 2/2021 | Arik et al. | |
| 2021/0304769 | A1 | 9/2021 | Ye et al. | |
| 2022/0108680 | A1 | 4/2022 | Zhang et al. | |

FOREIGN PATENT DOCUMENTS

| | | | |
|---|---|---|---|
| CN | 101286170 A * | 10/2008 | G10L 15/197 |
| TW | 201516756 A * | 5/2015 | |

OTHER PUBLICATIONS

International Search Report dated Jun. 15, 2023 in Application No. PCT/US2023/016025.

(Continued)

*Primary Examiner* — Shreyans A Patel

(74) *Attorney, Agent, or Firm* — Sughrue Mion, PLLC

(57) ABSTRACT

An unsupervised text to speech system utilizing a lexicon to map input text to the phoneme sequence, which is expanded to the frame-level forced alignment with a speaker-dependent duration model. An alignment mapping module that converts the forced alignment to the unsupervised alignment (UA). Afterword, a Conditional Disentangled Sequential Variational Auto-encoder (C-DSVAE), serving as the self-supervised TTS AM, takes the predicted UA and a target speaker embedding to generate the mel spectrogram, which is ultimately converted to waveform with a neural vocoder.

17 Claims, 6 Drawing Sheets

(56) References Cited

OTHER PUBLICATIONS

Written Opinion of the International Searching Authority dated Jun. 15, 2023 in Application No. PCT/US2023/016025.
Sergios Karagiannakos, "Speech Synthesis: A review of the best text to speech architectures with Deep Learning", AI Summer, May 13, 2021, pp. 1-2 (20 total pages), Retrieved from internet: URL: <https://theaisummer.com/text-to-speech/>.

* cited by examiner

TEXT TO SPEECH SYNTHESIS WITHOUT USING PARALLEL TEXT-AUDIO DATA

TECHNICAL FIELD

The present disclosure relates generally to text to speech, and more particularly to methods and apparatuses for text to speech for converting text to sound.

BACKGROUND OF THE INVENTION

Text-to-speech (TTS) synthesis plays an important role for human computer interaction. With the continuous development of neural-based TTS systems (e.g., Tacotron DurIAN, FastSpeech, or more recently Glow-TTS series), high-fidelity synthetic speech has reduced the gap between machine generated speech and human speech. This is especially true for languages with rich resources (e.g., languages with sizeable high quality parallel speech and textual data). Usually, a supervised TTS system requires dozens of hours of single-speaker high quality data to generate a quality performance. However, collecting and labeling such data is a non-trivial task, time-consuming, and expensive. Therefore, current supervised solutions still have their limitations on the demanding needs of ubiquitous deployment of customized speech synthesizers for AI assistants, gaming or entertainment industries. Natural, flexible, and controllable TTS pathways become more essential when facing these diverse needs.

SUMMARY OF THE INVENTION

According to embodiments, systems and methods are provided for an unsupervised text to speech method performed by at least one processor and comprising receiving an input text; generating an acoustic model comprising breaking the input text into at least one composite sound of a target language via a lexicon; predicting a duration of speech generated from the input text; aligning the least one composite sound to regularize the input text to follow the sounds of the target language as an aligned output; auto-encoding the aligned output and the duration of speech generated from the target input text to an output waveform; and outputting a sound from the outputted waveform.

In some embodiments, wherein predicting the duration of speech comprises sampling a speaker pool containing at least one voice; and calculating the duration of speech by mapping the lexicon sounds with a length of an input text and the speaker pool.

According to some embodiments, wherein the lexicon contains at least one phoneme sequence.

According to some embodiments, predicting an unsupervised alignment which aligns the sounds of the target language with the duration of speech; encoding the input text; encoding a prior content with the output of the predicted unsupervised alignment; encoding a posterior content with the encoded input text; decoding the prior content and posterior content; generating a mel spectrogram from the decoded prior content and posterior content; and processing the mel spectrogram through a neural vocoder to generate a waveform.

According to some embodiments, wherein the target input text is selected from a group consisting of: a book, a text message, an email, a newspaper, a printed paper, and a logo.

According to some embodiments, mapping the text as a forced alignment; and converting the forced alignment to an unsupervised alignment.

According to some embodiments the predicted duration is calculated in at least one logarithmic domain.

DETAILED DESCRIPTION OF THE INVENTION

Figure 1:
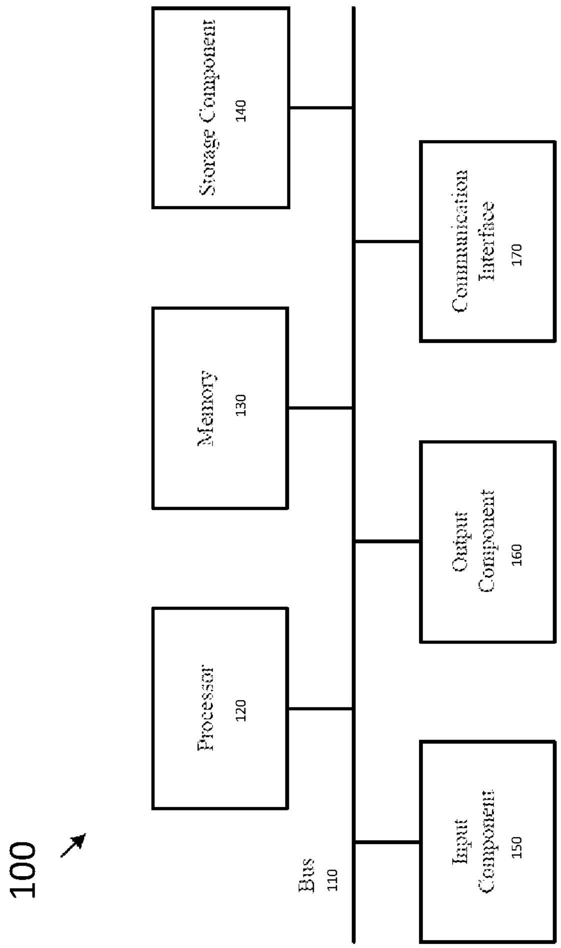
FIG. 1 is a system overview of an embodiment of the unsupervised text to speech system.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms.

Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Embodiments of the present disclosure are directed to an unsupervised text to speech system developed to overcome the problems discussed above. Embodiments of the present disclosure include an unsupervised text-to-speech (UTTS) framework, which does not require text-audio pairs for the TTS acoustic modeling (AM). In some embodiments, this UTTS may be a multi-speaker speech synthesizer developed from the perspective of disentangled speech representation learning. A method framework offers a flexible choice of a speaker's duration model, timbre feature (identity) and content for TTS inference. The unsupervised text to speech system may leverage recent advancements in self-supervised speech representation learning as well as speech synthesis front-end techniques for the system development.

Specifically, in some embodiments, the unsupervised text to speech system may utilize a lexicon to map input text to the phoneme sequence, which is expanded to the frame-level forced alignment (FA) with a speaker-dependent duration model. The input text may be any type of text, such as a book, a text message, an email, a newspaper, a printed paper, and a logo or any other alphabetic, or word representative pictogram. Next, an alignment mapping module may convert the FA to the unsupervised alignment (UA). Finally, a Conditional Disentangled Sequential Variational Auto-encoder (C-DSVAE), serving as the self-supervised TTS AM, may take the predicted UA and a target speaker embedding to generate the mel spectrogram, which is ultimately converted to a waveform with a neural vocoder. Unsupervised text-to-speech does not require parallel speech and textual data for training the TTS acoustic models (AM). Thus, the unsupervised text to speech system enables speech synthesis without using a paired TTS corpus.

FIG. 1 illustrates an exemplary system 100 of an embodiment for using the unsupervised text to speech. The exemplary system 100, may be one of a variety of systems such as a personal computer, a mobile device, a cluster of computers, a server, embedded device, ASIC, microcontroller, or any other device capable of running code. Bus 110 connects the exemplary system 100 together such that all the components may communication with one another. The bus 110 connects the processor 120, the memory 130, the storage component 140, the input component 150, the output component 160 and the interface component.

The processor 120 may be a single processor, a processor with multiple processors inside, a cluster (more than one) of processors, and/or a distributed processing. The processor carries out the instructions stored in both the memory 130 and the storage component 140. The processor 120 operates as the computational device, carrying out operations for the unsupervised text to speech process. Memory 130 is fast storage and retrieval to any of the memory devices can be enabled through the use of cache memory, which can be closely associated with one or more CPU. Storage component 140 may be one of any longer term storage such as a HDD, SSD, magnetic tape or any other long term storage format.

Input component 150 may be any file type or signal from a user interface component such as a camera or text capturing equipment. Output component 160 outputs the processed information to the communication interface 170. The communication interface may be a speaker or other communication device which may display information to a user or another observer such as another computing system.

Figure 2:
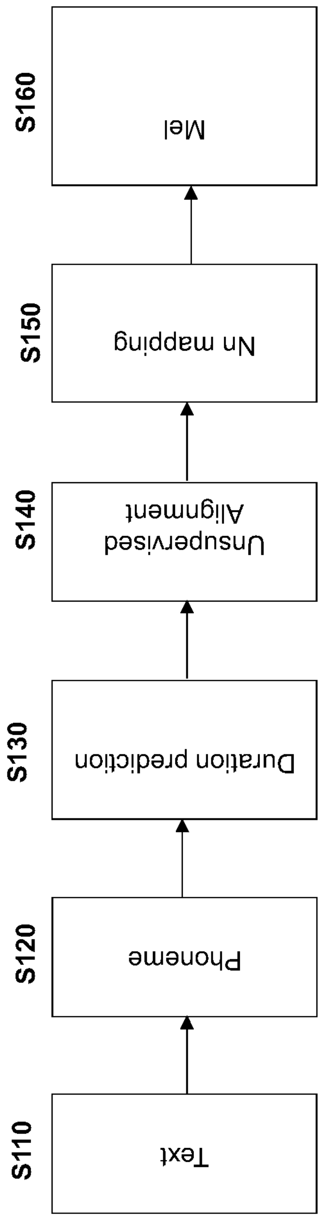
FIG. 2 is a block diagram of an embodiment of the process of the unsupervised text to speech system.

FIG. 2 details process steps of an exemplary embodiment of an unsupervised text-to-speech process. The process may start at step S110, where text is inputted into the unsupervised text-to-speech (UTTS). The input text may be any text in any language for which there are spoken words. The process proceeds to step S120, where the text is then broken down into phonemes, which may correspond to distinct sounds of the language and each word. After the phonemes are determined, the process makes a determination of the length of the speech to be produced. In the case of lengthy text or words with a large amount of sounds and/or syllables, the process may determine that the length of speech will be longer. In the case of a short amount of text or sounds and/or syllables, the process may determine that the length of speech will be smaller.

The process proceeds from step S130 to step S140, where an unsupervised alignment is performed. As an example, forced alignment (FA) may refer to the process by which orthographic transcriptions are aligned to audio recordings to automatically generate phone level segmentation. Unsupervised alignment (UA) may refer to a process to condition and regularize the output of a text to speech system to follow the phonetic structure. Next, the Nn mapping step S150 converts the FA to the unsupervised alignment. Finally, a mel spectrogram is generated S160 which may be played out of a speaker finishing the text to speech process.

Figure 3:
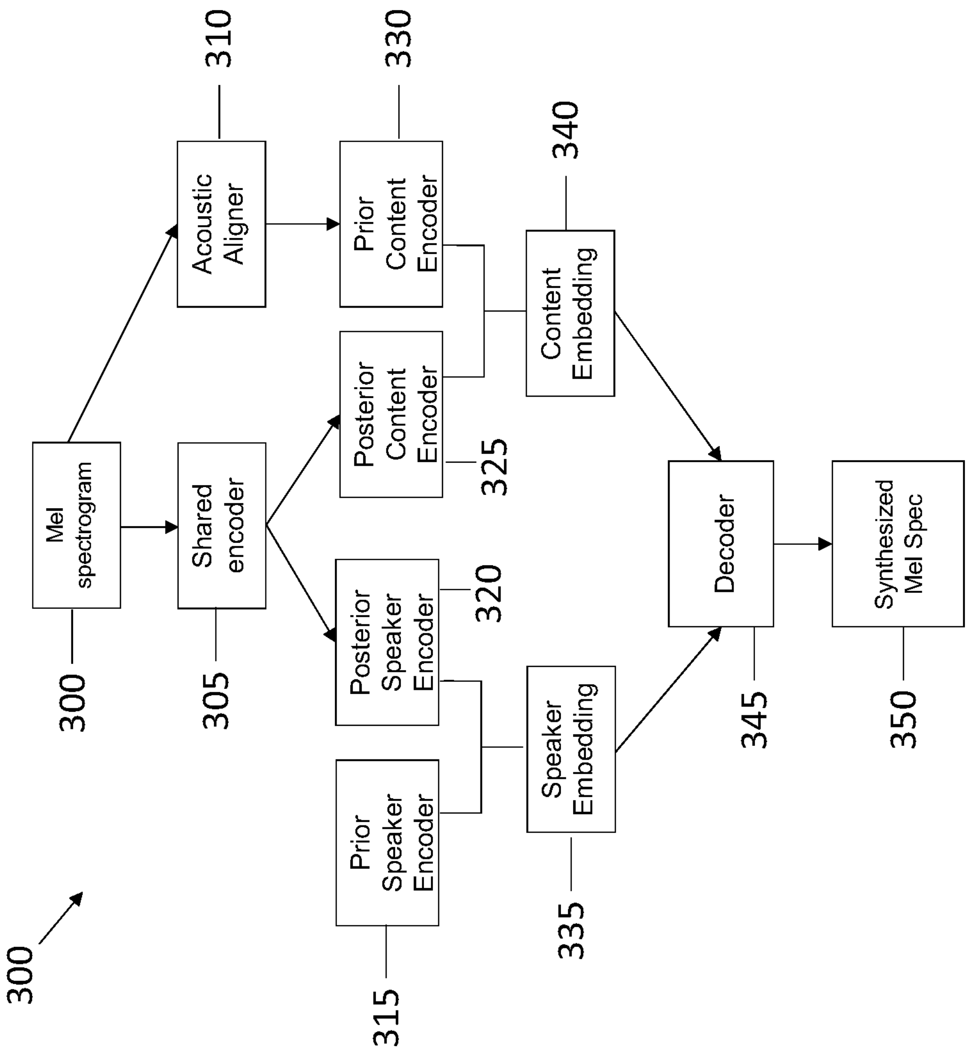
FIG. 3 is an embodiment of the C-DSVAE system and training.

FIG. 3 is an embodiment of the Conditional Disentangled Sequential Variational Auto-encoder (C-DSVAE) system and training. The backbone of this encoder may be the DSVAE architecture which consists of a shared encoder 305, a posterior speaker encoder 320, a posterior content encoder 325, a prior speaker encoder 315, a prior content encoder 330, a decoder 345 and finally the synthesized mel speech 350. The mel spectrogram 300 may be passed into shared encoder 305, followed by posterior encoder 320 and posterior content encoder 325, which encodes the speaker posterior distribution q(z_s|X) and the content posterior distribution q(z_c|X). After the distributions are generated, the distributions pass respectively to the speaker embedding 335 and the content embedding 340. Next, both the data acted upon by the speaker embedding 335 and the content embedding 340 are decoded by the decoder 345 which results in synthesized mel speech 350.

For the prior modeling, the prior speaker encoder 315 may encode the speaker prior p(z_s) and the posterior content encoder 325 may encode the content prior p(z_c). During the decoding/generation stage, the speaker embedding 335 (z_s) and content embedding 340 (z_c) are sampled from either the posteriors q(z_s|X) and q(z_c|X), or the priors p(z_s) and p(z_c), and the concatenation of them is passed into decoder D to generate the synthesized speech.

In some embodiments, in order to generate phonetically meaningful and continuous speech with stable vocalizations, the unsupervised text to speech system may use the acoustic alignment 310 (A_X) as the condition for content prior distribution. In some embodiments, the unsupervised text to speech system may use two types of acoustic alignment: forced alignment (FA) and unsupervised alignment (UA). In the present embodiment, A_X^FA may represent the forced alignment of the utterance X. The forced alignment may be Montreal forced alignment (MFA) to extract the forced alignment given audio-text pair. The unsupervised text to speech system adopts the WavLM-Base model to extract the acoustic features. In some embodiments, in order to capture the robust and long-range temporal relations over acoustic units and to generate more continuous speech, the unsupervised text to speech system adopts the Masked Unit Prediction (MUP) when training the prior content encoder 330 (Ecp).

Computationally, the variable M(A_X)⊂[T] may denote the collection of T masked indices for a specific condition A_X, where the masking configuration is consistent. The variable (AX)^ may represent a corrupted version of A_X, in which A_Xt will be masked out if t∈M(A_X). The variable z_cp may represent the sample of output of E_cp (i.e., z_cp~E_cp (A_X)). The negative loglikelihood loss (NLL) LMUP-C for condition modeling is defined in Eq. 1, where p(z_cpi|(A_Xi)^) is the softmax categorical distribution. EAX denotes the expectation over all A_X. An embodiment of the masked prediction loss may be formulated as follows:

$$\mathcal{L}_{MUP\text{-}C}=-\mathbb{E}_{A_X}\Sigma_{i\in M(A_X)}\log p(z_{cp_i}|\tilde{A}_{X_i}) \quad \text{Eq. 1}$$

In some embodiments, the C-DSVAE loss objective may be formulated as follows:

$$\mathcal{L}_{KLD_c\text{-}C}=\mathbb{E}_{p(X)}[KLD(q_\theta(z_c|X)\|p_\theta(z_c|A_X))] \quad \text{Eq. 2}$$

$$\mathcal{L}_{C\text{-}DSVAE}=\mathbb{E}_{p(X)}\mathbb{E}_{q\theta(s_x,z_c|X)}[-\log(p_\theta(X|z_x,z_c))]+\alpha\mathcal{L}_{KLD_s}+\beta\mathcal{L}_{KLD_c}-c+\gamma\mathcal{L}_{MUP\text{-}C} \quad \text{Eq. 3}$$

Figure 4:
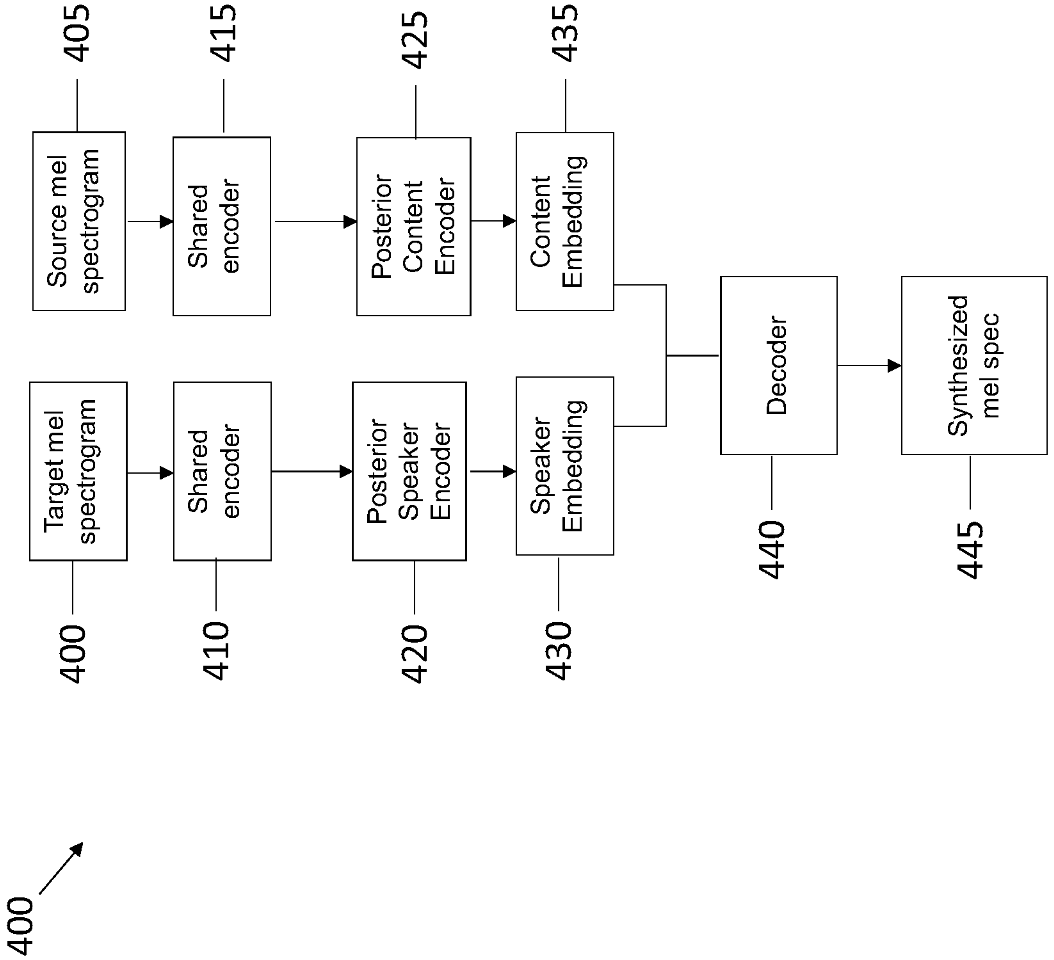
FIG. 4 is an embodiment of voice conversion of the unsupervised text to speech system.

FIG. 4 is an embodiment of voice conversion of the unsupervised text to speech system. The voice conversion includes a target mel spectrogram 400 and a source mel spectrogram 405 which are fed into a shared encoder 410/415 (differing depending on the separate paths). After being processed by the shared encoder 410, the first text 400 is then passed to the posterior speaker encode 420 and then the speaker embedding 430. The second text 405 is moved through the posterior content encoder 425 then moves to the content embedding 435. Penultimately, the branches are fed together into the decoder 440 which ends with synthesized mel speech 445.

Figure 5:
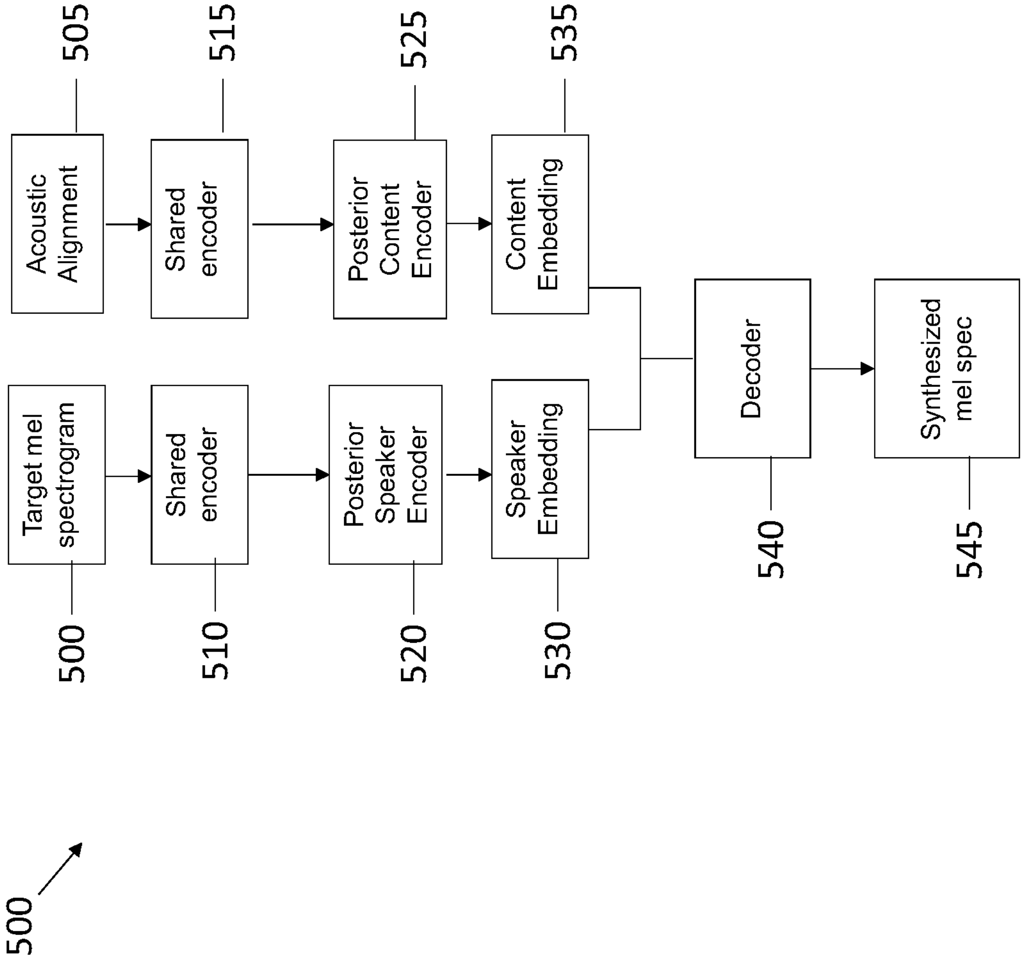
FIG. 5 is an embodiment of the alignment driven voice generation.

FIG. 5 is an embodiment of the alignment driven voice generation. The voice conversion includes a target mel spectrogram 500 and an acoustic alignment 505 which are fed into a shared encoder 510/515 (differing depending on the separate paths). After being processed by the shared encoder 510, the target mel spectrogram 500 is then passed to the posterior speaker encode 520 and then the speaker embedding 530. The acoustic alignment 505 is moved through the posterior content encoder 525, then moves to the content embedding 535. Penultimately, the branches are fed together into the decoder 540 which ends with synthesized mel speech 545.

Figure 6:
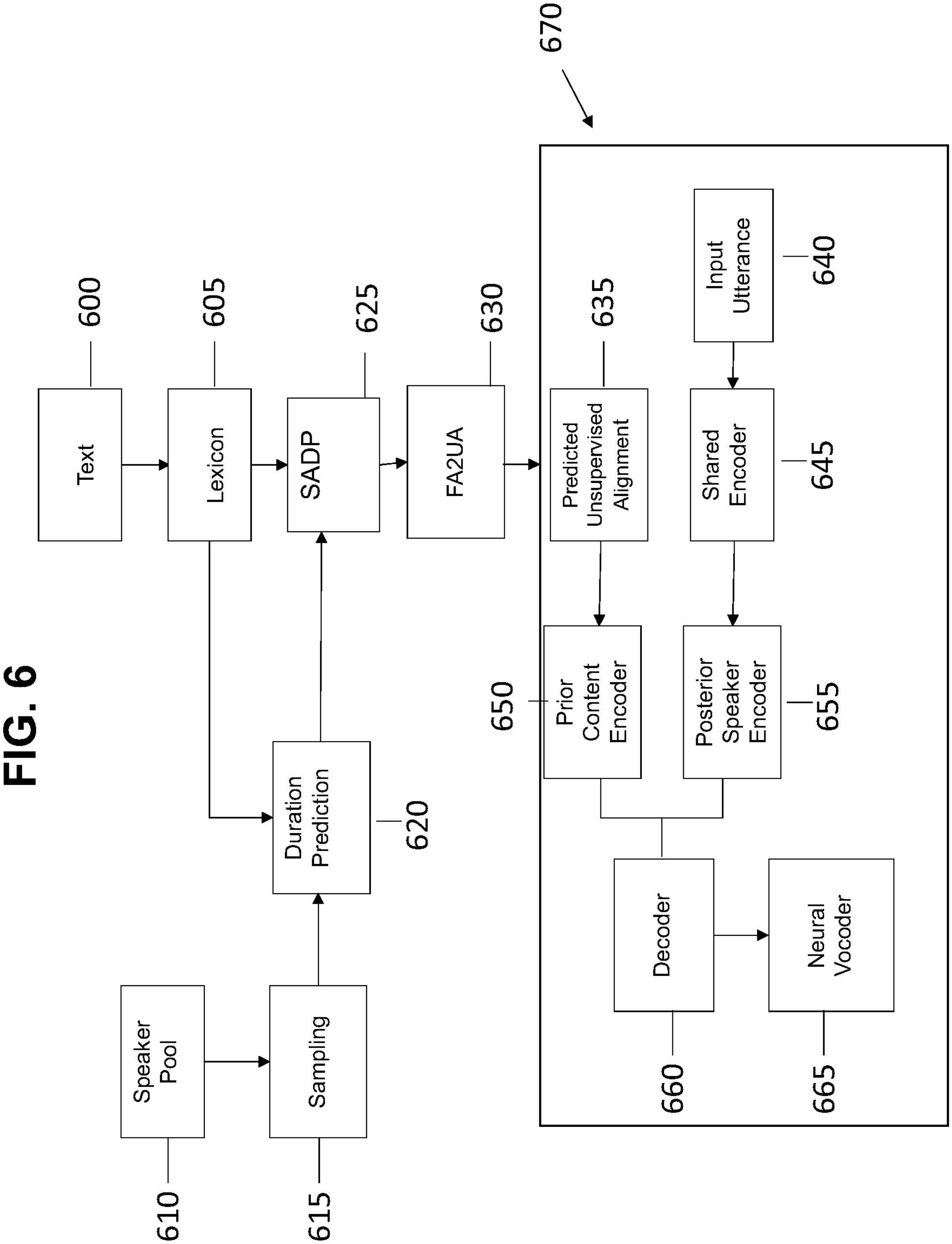
FIG. 6 is a block diagram of an embodiment of the unsupervised text to speech system.

FIG. 6 is a block diagram of an embodiment of the unsupervised text to speech system. First an input text 600 is fed into the system. The input text 600 is first broken down to obtain the phoneme sequence of the text transcription with the lexicon 605. The lexicon 605 may be one of Librispeech Lexicon, CMUdict, Amazon Polly, or other defined lexicons. The phoneme sequence is then converted to a list of token indices.

At the same time, the duration predictor 620 takes the phoneme sequence (lexicon 605 output) as well as sampled 615 information from the speaker pool 610 as input to predict the speaker-aware duration for each phoneme. Specifically, the phoneme sequence is first passed into a trainable look-up table to obtain the phoneme embeddings. Afterwards, a four-layer multi-head attention (MHA) module is followed to extract the latent phoneme representation. A two-layer cony-1D module is then used to take the summation of latent phoneme representation and speaker embedding sampled from the speaker pool. A linear layer is finally applied to generate the predicted duration in the logarithmic domain. The predicted duration outputted to the Speaker-Aware Duration Prediction (SADP) 625 as a length of the speech predicted.

The phoneme sequence together with a random speaker embedding is passed into the Speaker-Aware Duration Prediction (SADP) 625 which delivers the predicted forced alignment (FA). The forced alignment to unsupervised alignment (FA2UA) 630 module takes the predicted FA as input and predicts the unsupervised alignment 635 (UA). The UA 635 along with an input utterance 640 is fed into the Conditional Disentangled Sequential Variational Auto-encoder (C-DSVAE) 670 to generate the mel spectrogram. The predicted unsupervised alignment 635 is fed to the prior content encoder 650 then to the decoder 660. At the same time the input utterance 640 is fed to the shared encoder 645 then to the posterior speaker encoder 655 and finally meets the data of prior content encoder 650 in the decoder 660 to generate a mel spectrogram. A neural vocoder 665 is then applied to convert the mel spectrogram to waveform. It is observable that the proposed UTTS system performs zero-shot voice cloning for the target utterance. Both the modules including C-DSVAE 670 are trained separately. The detailed model architectures are presented in Table. 1.

TABLE 1

| UTTS Model Architecture | | |
|---|---|---|
| C-DSVAE | $E_{Share}$ | Conv1D(256, 5, 2, 1)→ InstanceNorm2D→ ReLU) × 3 |
| | $E_{sq}$ | BiLSTM(512, 2)→ Average Pooling → (Dense(64)⇒ mean, Dense(64)⇒ std) |
| | $E_{sp}$ | Identity Mapping |
| | $E_{cq}$ | BiLSTM(512, 2)→RNN(512, 1)→ (Dense(64)⇒ mean, Dense(64)⇒ std) |
| | $E_{cp}$ | BiLSTM(512, 2)→ (Dense(64)⇒ mean, Dense(64)⇒ std)(→ Linear Classifier) |
| | $D_{pre}$ | (InstanceNorm2D→ Conv1D(512, 5, 2, 1)→ ReLU) × 3 |
| | | LSTM(512, 1) → LSTM(1024, 2) → Dense(80) |
| | $D_{post}$ | (Conv1D(512, 5, 2, 1)→ tanh→ InstanceNorm2D) × 4 |
| Duration Predictor | | nn.Embedding→MHA(256, 128, 128, 2)→ Conv1D(256, 3, 2, 1) → Dense(1) |
| FA2UA | | nn.Embedding→BiLSTM(256, 3)→ Linear Classifier |

Table 1 illustrates the UTTS system in detail. For Conv1D, the configuration is (filter size, kernel size, padding, and stride). For Multi-Head-Attention (MHA) the configuration may be model dimension, key dimension, value dimension, no. of heads. For LSTM/BiLTSM/RNN, the configuration may be hidden dim, layers. For Dense layer, the configuration may be output dim.

The UTTS system in table 1 breaks down the architecture into further component parts, the C-DSVAE 670, the duration predictor and the FA2UA. The C-DSVAE 670 comprises a shared encoder 645, a prior speaker encoder, a posterior speaker encoder 655, a posterior content encoder, a prior content encoder 650, a prior content decoder, and a posterior content decoder. The shared encoder 645 is comprised of Conv1D, an InstanceNorm2D and a ReLU. The posterior speaker encoder comprises of BiLSTM, an Average Pooling, a Dense(64) to mean and a Dense(64) to standard deviation. The prior speaker consists of an Identity Mapping. The posterior content encoder comprises of BiLSTM, a RNN a Dense(64) to mean and a Dense(64) to standard deviation. The prior content encoder comprises a BiLSTM, a Dense(64) to mean, a Dense(64) to standard deviation and a Linear Classifier. The prior content decoder comprises a LSTM (512,1) to a LSTM (1024, 2) to a Dense(80). The posterior content decoder comprises a Conc1D to tanh to an InstanceNorm2D. Further, the Duration predictor is comprised of nn.Embedding to MHA to a Conv1D to a Dense(1). Finally, the FA2UA is comprised nn.Embedding to BiLSTM to a linear classifier.

During training, the MSE (Mean Squared Error) may be adopted between the predicted duration 620 and the target duration. The target duration for the text is obtained from the forced alignment extracted by Montreal Forced Alignment (MFA) or other forced alignment methods. In some embodiments, the target duration may be in the logarithmic domain. During inference, duration may be rounded up.

The FA2UA 630 module takes the forced alignment (FA) as input and predicts the corresponding unsupervised alignment (UA). Specifically, FA is first passed into a learnable look-up table to obtain the FA embeddings. Subsequently, a 3-layer Bi-LSTM module may be employed to predict the UA embeddings given FA embeddings. During training, a mask prediction is adopted training strategy to train our FA2UA module as masked prediction is expected to be good at capturing the long-range time dependency across tokens and encode more contextualized information for each token.

Computationally, the unsupervised text to speech denotes M(FA)⊂T as the collection of T masked indices for a specific unsupervised alignment FA. The variable (FA)˜ may be a corrupted version of FA in which 〖FA〗_i may be masked out if i∈M(FA). The variable 〖UA〗_i may correspond to the frame of FA. The negative loglikelihood loss (NLL) L_FA2UA for masked prediction training may be defined in the following, where p(〖UA〗_i|(〖FA〗_i)˜) is the softmax categorical distribution. The variable E_((FA,UA)) denotes the expectation over all (FA,UA) pairs. During the inference, the token with the maximum probability is chosen, p(UA_i〖FA_i), at each time step i to form the predicted UA sequence. Thus, the FA2UA 630 may be defined as follows:

$$\mathcal{L}_{FA2UA} = -\mathbb{E}_{(FA,UA)} \Sigma_{i \in M(FA)} \log p(UA_i | \tilde{FA}_i) \qquad \text{Eq. 4}$$

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, implement the operations specified in the flowchart and/or block diagram block or blocks. These computer readable program instructions may also be stored in a computer readable storage medium that can direct a computer, a programmable data processing apparatus, and/or other devices to operate in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the operations specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical operation(s). The method, computer system, and computer readable medium may include additional blocks, fewer blocks, different blocks, or differently arranged blocks than those depicted in the Figures. In some alternative implementations, the operations noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified operations or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. An unsupervised text to speech method performed by at least one processor and comprising:
- receiving an input text;
- generating an acoustic model comprising:
  - breaking the input text into at least one composite sound of a target language via a lexicon;
  - predicting a duration of speech generated from the input text;
  - aligning the least one composite sound to regularize the input text to follow the sounds of the target language as an aligned output, the aligning comprising (i) mapping the text as a forced alignment, and (ii) converting the forced alignment to an unsupervised alignment;
  - auto-encoding the aligned output and the duration of speech generated from the target input text to an output waveform; and
  - outputting a sound from the outputted waveform.

2. The unsupervised text to speech method of claim 1, wherein predicting the duration of speech comprises:
- sampling a speaker pool containing at least one voice; and
- calculating the duration of speech by mapping the lexicon sounds with a length of an input text and the speaker pool.

3. The unsupervised text to speech method of claim 1, wherein the lexicon contains at least one phoneme sequence.

4. The unsupervised text to speech method of claim 1, wherein the auto-encoding the aligned output further comprises:
- predicting an unsupervised alignment which aligns the sounds of the target language with the duration of speech;
  - encoding the input text;
- encoding a prior content with the output of the predicted unsupervised alignment;
  - encoding a posterior content with the encoded input text;
- decoding the prior content and posterior content;
- generating a mel spectrogram from the decoded prior content and posterior content; and
  - processing the mel spectrogram through a neural vocoder to generate a waveform.

5. The unsupervised text to speech method of claim 1,
- wherein the target input text is selected from a group consisting of: a book, a text message, an email, a newspaper, a printed paper, and a logo.

6. The unsupervised text to speech method of claim 2, wherein the aligning further comprises:
- the predicted duration is calculated in at least one logarithmic domain.

7. An unsupervised text to speech device comprising:
- at least one memory configured to store computer program code;
- at least one processor configured to operate as instructed by the computer program code, the computer program code including:
- acoustic modeling code configured to cause the at least one processor to generate an acoustic model having at least one lexicon including sounds of a target language, the acoustic modeling code further including:
- duration predictor code configured to cause the at least one processor to predict a duration of speech generated from a target input text;
- alignment code configured to cause the at least one processor to align the at least one composite sound to regularize the input text to follow the sounds of the target language as an aligned output, the aligning comprising (i) mapping the text as a forced alignment, and (ii) converting the forced alignment to an unsupervised alignment; and
- auto-encoder code configured to cause the at least one processor to transform the aligned output and the duration of speech generated from the target input text to an output waveform.

8. The unsupervised text to speech device of claim 7, wherein the duration predictor code further includes duration calculator code configured to cause the at least one processor to calculate the duration of the speech by mapping the lexicon sounds with a length of an input text,
- wherein the duration predictor code further causes the processer to predict the duration of speech based on speaker pool data containing at least one sampled voice.

9. The unsupervised text to speech device of claim 7, wherein the lexicon comprises at least one phoneme sequence.

10. The unsupervised text to speech device of claim 7, wherein the auto-encoder code configured further comprises:

predicted unsupervised alignment code configured to cause the at least one processor to align the sounds of the target language with the duration of speech;

shared encoder code configured to cause the at least one processor to encode the input text;

prior content encoder code configured to cause the at least one processor to encode the output of the predicted unsupervised alignment posterior;

posterior content encoder code configured to cause the at least one processor to encode the output of the shared encoder;

decoder code configured to cause the at least one processor to combine the output of the prior content encoder and the posterior content encoder and generates a mel spectrogram; and a neural vocoder which generates a waveform from the mel spectrogram.

11. The unsupervised text to speech device of claim 7, wherein the target input text is selected from a group consisting of: a book, a text message, an email, a newspaper, a printed paper, and a logo.

12. The unsupervised text to speech device of claim 8, wherein the duration predictor code is configured to cause the processor to predict the duration of speech in at least one logarithmic domain.

13. A non-transitory computer readable medium having instructions stored therein, which when executed by a processor cause the processor to:

receive an input text;

generate an acoustic model comprising:

break the input text into at least one composite sound of a target language via a lexicon;

predict a duration of speech generated from the input text;

align the least one composite sound to regularize the input text to follow the sounds of the target language as an aligned output, the alignment further causing the processor to (i) map the text as a forced alignment, and (ii) convert the forced alignment to an unsupervised alignment;

auto-encode the aligned output and the duration of speech generated from the input text as an output waveform; and output a sound from the outputted waveform.

14. The non-transitory computer readable medium according to claim 13, wherein predicting the duration comprises:

sampling a speaker pool containing at least one voice; and calculating the duration of speech by mapping the lexicon sounds with a length of an input text and the speaker pool.

15. The non-transitory computer readable medium according to claim 13, wherein the lexicon comprises at least one phoneme sequence.

16. The non-transitory computer readable medium according to claim 13, wherein the instructions are configured to further cause the processor to:

predict an unsupervised alignment which aligns the sounds of the target language with the duration of speech;

encode the input text;

encode a prior content with the output of the predicted unsupervised alignment;

encode a posterior content with the encoded input text;

decode the prior content and posterior content;

generate a mel spectrogram from the decoded prior content and posterior content; and process the mel spectrogram through a neural vocoder to generate a waveform.

17. The non-transitory computer readable medium according to claim 13, wherein the target input text is selected from a group consisting of: a book, a text message, an email, a newspaper, a printed paper, and a logo.

* * * * *